United States Patent
Peri et al.

(10) Patent No.: US 10,430,608 B2
(45) Date of Patent: Oct. 1, 2019

(54) SYSTEMS AND METHODS OF AUTOMATED COMPLIANCE WITH DATA PRIVACY LAWS

(71) Applicant: Salesforce.com, Inc., San Francisco, CA (US)

(72) Inventors: Harish Peri, San Francisco, CA (US); Shiela Jacques, San Mateo, CA (US); Atul Singh, Fremont, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 116 days.

(21) Appl. No.: 14/266,525

(22) Filed: Apr. 30, 2014

(65) Prior Publication Data

US 2014/0373182 A1    Dec. 18, 2014

Related U.S. Application Data

(60) Provisional application No. 61/835,225, filed on Jun. 14, 2013.

(51) Int. Cl.
*G06F 7/04* (2006.01)
*G06F 17/30* (2006.01)
*H04N 7/16* (2011.01)
*G06F 21/62* (2013.01)

(52) U.S. Cl.
CPC .............. *G06F 21/6245* (2013.01)

(58) Field of Classification Search
CPC .................................. G06F 21/6245
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — John B King
*Assistant Examiner* — Darshan I Dhruv
(74) *Attorney, Agent, or Firm* — Morris & Kamlay LLP

(57) ABSTRACT

The technology disclosed relates to automated compliance with data privacy laws of varying jurisdictions. In particular, it relates to constructing trust filters that automatically restrict collection, use, processing, transfer, or consumption of any person-related data that do not meet the data privacy regulations of the applicable jurisdictions. The trust filters are constructed dependent on associating person-related data entities with trust objects that track person-related data sources.

15 Claims, 8 Drawing Sheets

Flowchart of Automatically Complying with Data Privacy Laws

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,480,850 B1* | 11/2002 | Veldhuisen ......... G06F 21/6245 707/610 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,266,846 B2* | 9/2007 | King ..................... G06Q 20/209 380/227 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,416,954 B1* | 4/2013 | Raizen ................ H04L 63/0428 380/277 |
| 8,423,792 B2* | 4/2013 | Luciani ................. G06F 21/602 713/192 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,607,308 B1* | 12/2013 | Langford ............... G06Q 40/00 705/1.1 |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,207,866 B2* | 12/2015 | Boeuf ................. G06F 12/0269 |
| 9,537,656 B2* | 1/2017 | Debout ............... G06F 12/1408 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004734 A1* | 1/2003 | Adler ..................... G06Q 10/10 726/27 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0262361 A1* | 11/2005 | Thibadeau ............. G06F 21/80 713/193 |
| 2006/0021019 A1 | 1/2006 | Hinton et al. |
| 2006/0026042 A1* | 2/2006 | Awaraji ................ G06F 19/328 705/3 |
| 2006/0085443 A1* | 4/2006 | Pae ..................... G06F 21/6227 |
| 2007/0269044 A1* | 11/2007 | Bruestle ................. G06F 21/10 380/54 |
| 2008/0107262 A1* | 5/2008 | Helfman ................. G06F 21/62 380/44 |
| 2008/0229114 A1* | 9/2008 | Okabe .................... G06F 21/57 713/189 |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | | |
|---|---|---|---|
| 2009/0177744 A1 | 7/2009 | Marlow et al. | |
| 2009/0178144 A1* | 7/2009 | Redlich | G06F 21/6209 726/27 |
| 2009/0326791 A1* | 12/2009 | Horvitz | G01C 21/3461 701/119 |
| 2011/0035577 A1* | 2/2011 | Lin | H04L 63/0428 713/150 |
| 2011/0055560 A1* | 3/2011 | Meissner | G06F 21/602 713/166 |
| 2011/0154023 A1* | 6/2011 | Smith | G06F 21/78 713/155 |
| 2011/0218958 A1 | 9/2011 | Warshavsky et al. | |
| 2011/0238482 A1* | 9/2011 | Carney | G06F 21/31 705/14.36 |
| 2011/0246785 A1* | 10/2011 | Linsley | G06F 21/53 713/189 |
| 2011/0247051 A1 | 10/2011 | Bulumulla et al. | |
| 2011/0264786 A1* | 10/2011 | Kedem | G06F 9/45558 709/223 |
| 2012/0017095 A1* | 1/2012 | Blenkhorn | G06F 21/602 713/189 |
| 2012/0036347 A1* | 2/2012 | Swanson | G06F 21/572 713/2 |
| 2012/0042218 A1 | 2/2012 | Cinarkaya et al. | |
| 2012/0047552 A1* | 2/2012 | Sengupta | G06F 21/60 726/1 |
| 2012/0084574 A1* | 4/2012 | Nakanishi | G06F 21/602 713/193 |
| 2012/0131336 A1* | 5/2012 | Price | G06F 21/78 713/165 |
| 2012/0222083 A1* | 8/2012 | Vaha-Sipila | H04L 63/102 726/1 |
| 2012/0233137 A1 | 9/2012 | Jakobson et al. | |
| 2012/0246739 A1* | 9/2012 | Mebed | G06F 21/00 726/28 |
| 2012/0290407 A1 | 11/2012 | Hubbard et al. | |
| 2012/0304265 A1* | 11/2012 | Richter | G06Q 10/00 726/7 |
| 2013/0054979 A1* | 2/2013 | Basmov | G06F 21/602 713/193 |
| 2013/0067242 A1* | 3/2013 | Lyakhovitskiy | G06F 21/00 713/193 |
| 2013/0091210 A1* | 4/2013 | Rajakarunanayake | H04W 4/21 709/204 |
| 2013/0145027 A1* | 6/2013 | Parthasarathy | G06F 21/6218 709/225 |
| 2013/0173642 A1* | 7/2013 | Oliver | G06F 17/27 707/756 |
| 2013/0212497 A1 | 8/2013 | Zelenko et al. | |
| 2013/0247216 A1 | 9/2013 | Cinarkaya et al. | |
| 2014/0032933 A1* | 1/2014 | Smith | G06F 21/6209 713/193 |
| 2014/0188804 A1* | 7/2014 | Gokhale | G06F 21/6218 707/645 |
| 2014/0230007 A1* | 8/2014 | Roth | G06F 21/6209 726/1 |
| 2015/0227976 A1* | 8/2015 | Glorikian | H04L 29/12311 705/14.58 |

\* cited by examiner

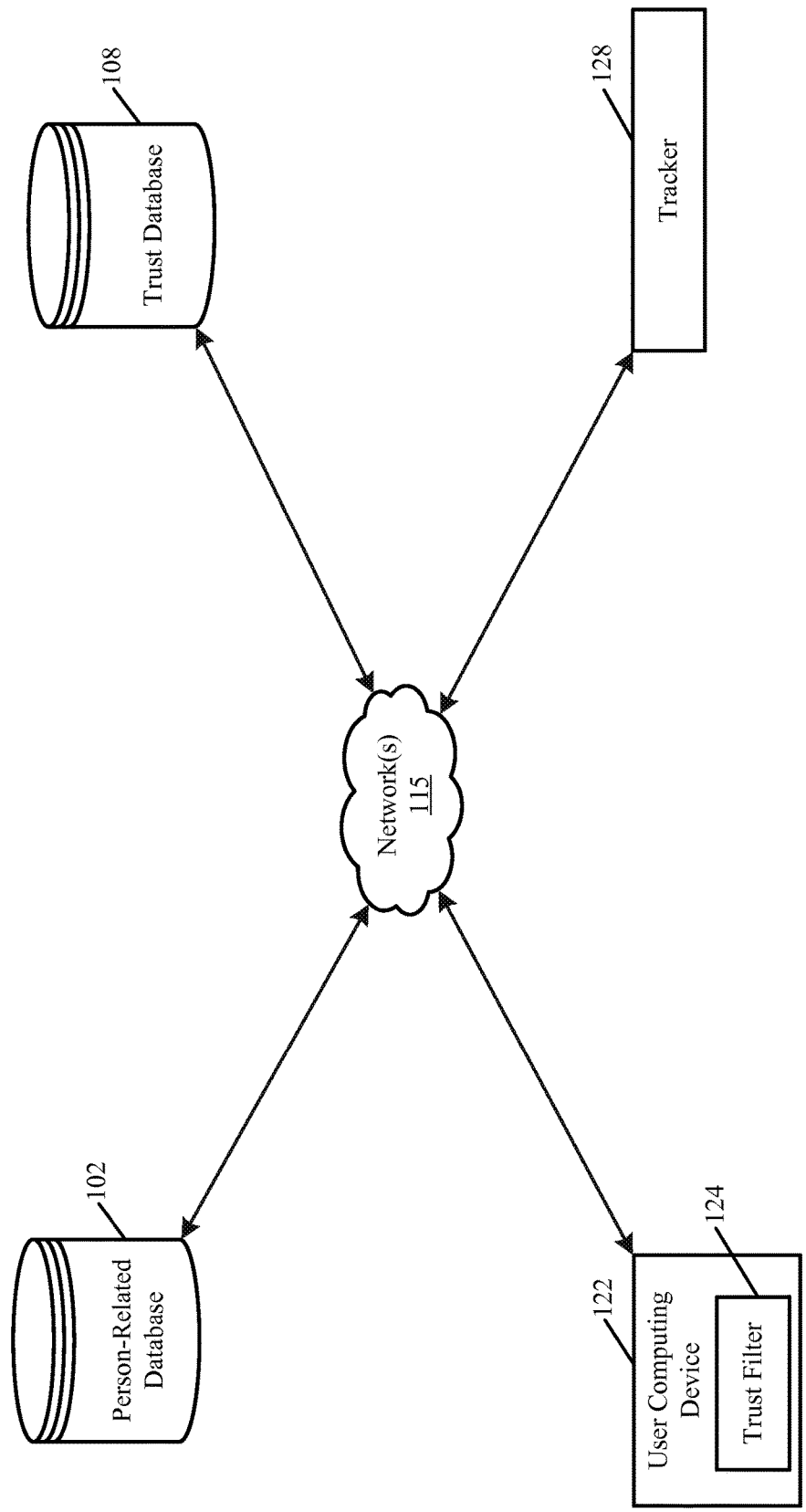
FIG. 1 – Automated Compliance Environment

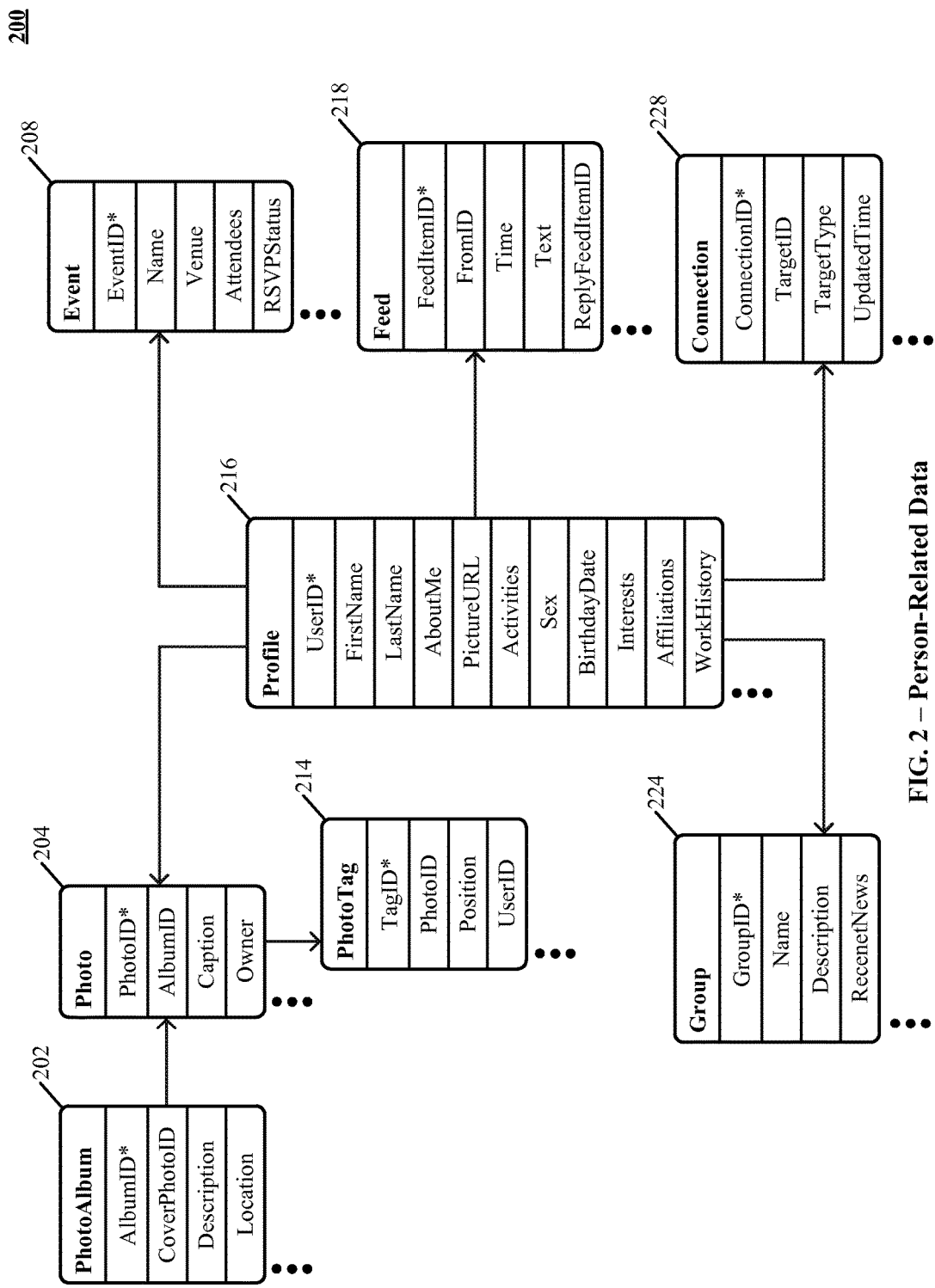
FIG. 2 – Person-Related Data

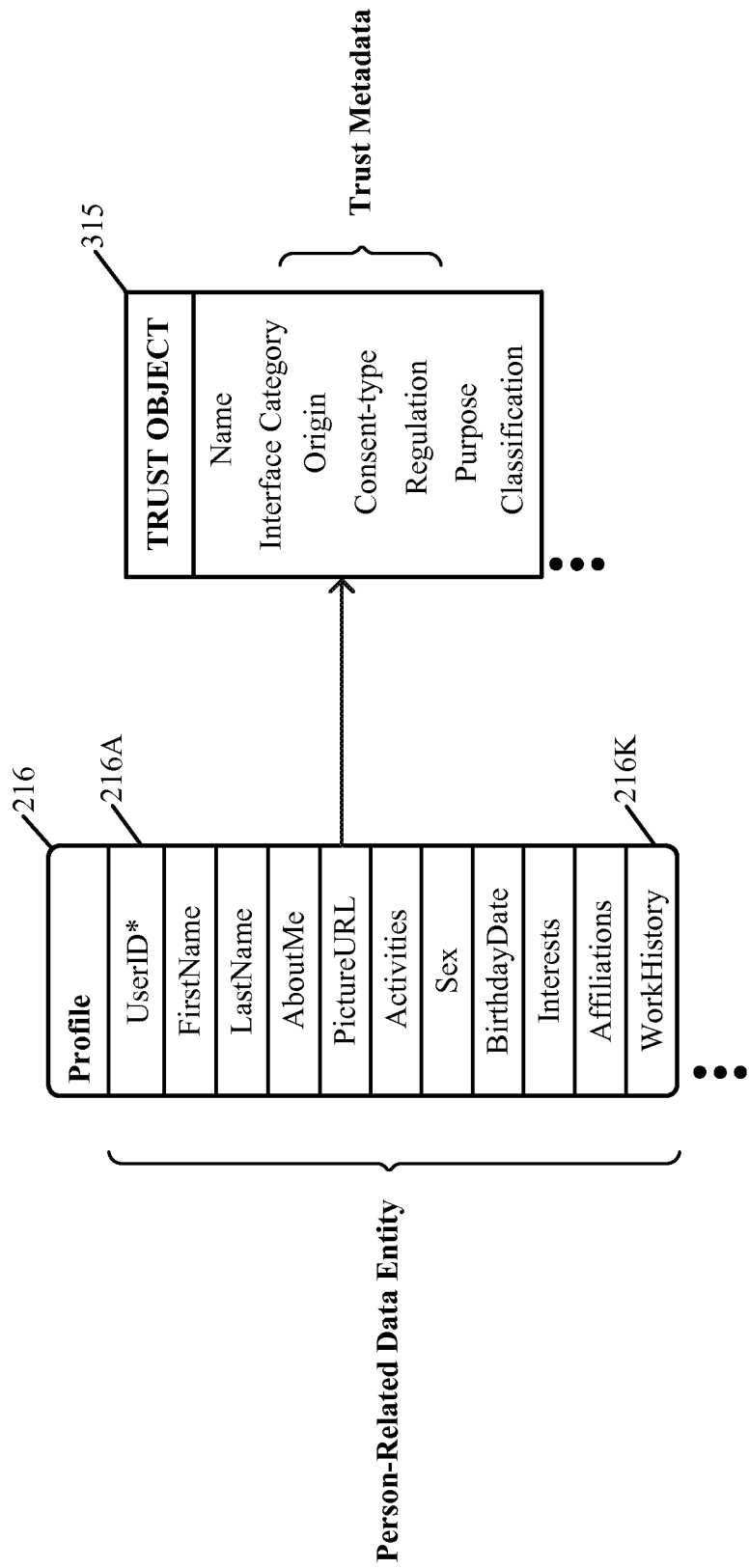
FIG. 3 – Trust Object Linked to Person-Related Data

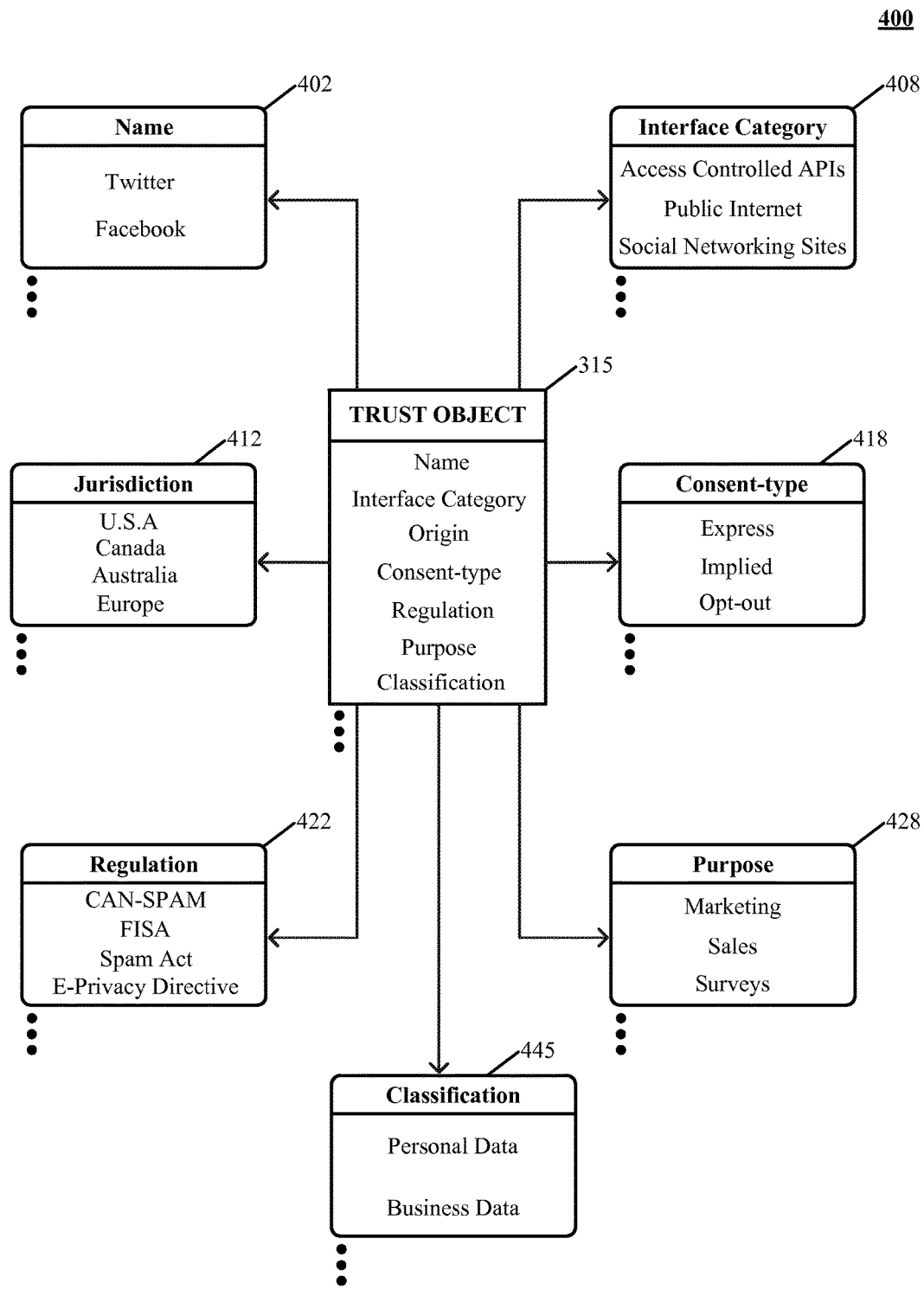
FIG. 4 – Trust Object and Trust Metadata

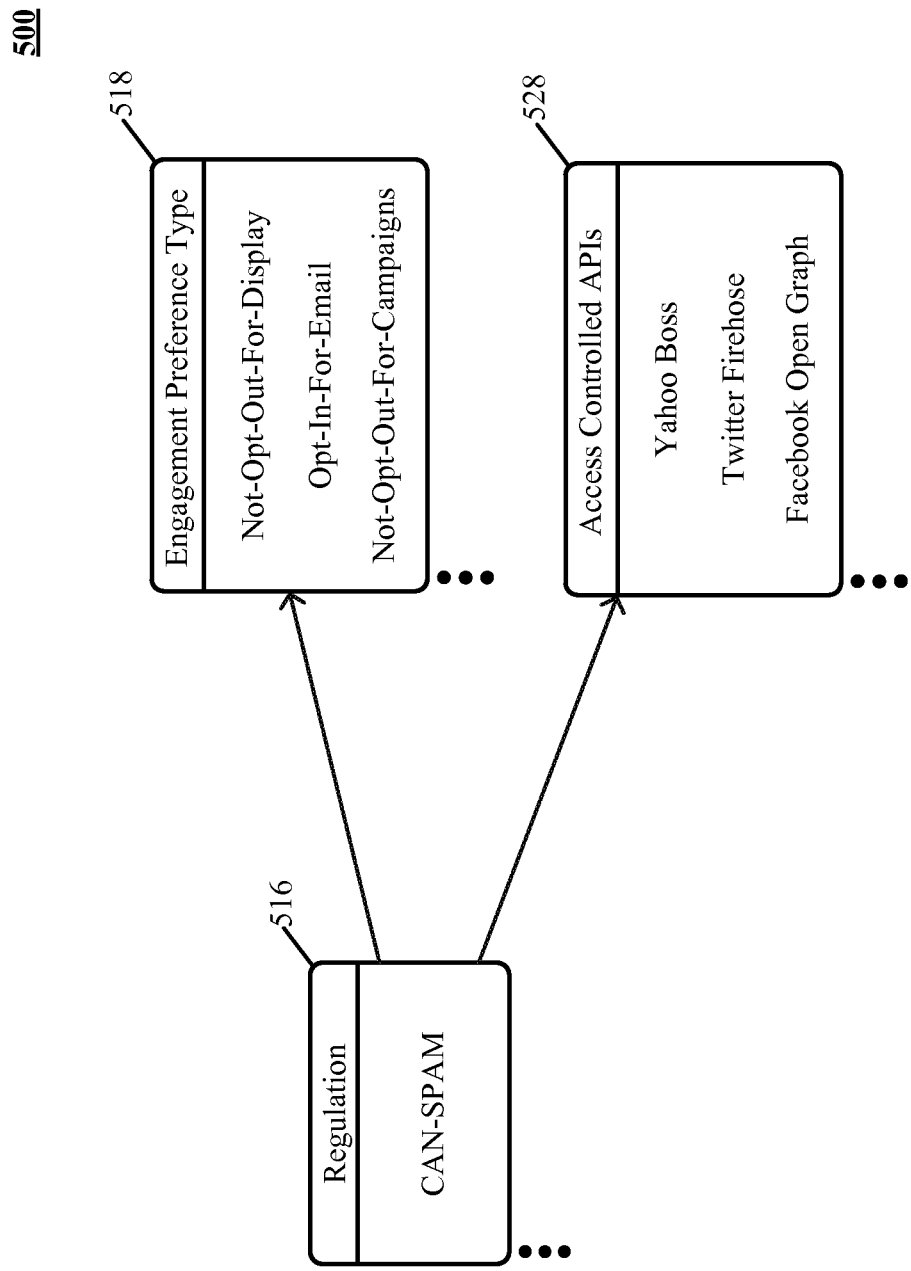
FIG. 5 – Acceptable Values of Trust Metadata

FIG. 6 – Trust Filter Interface

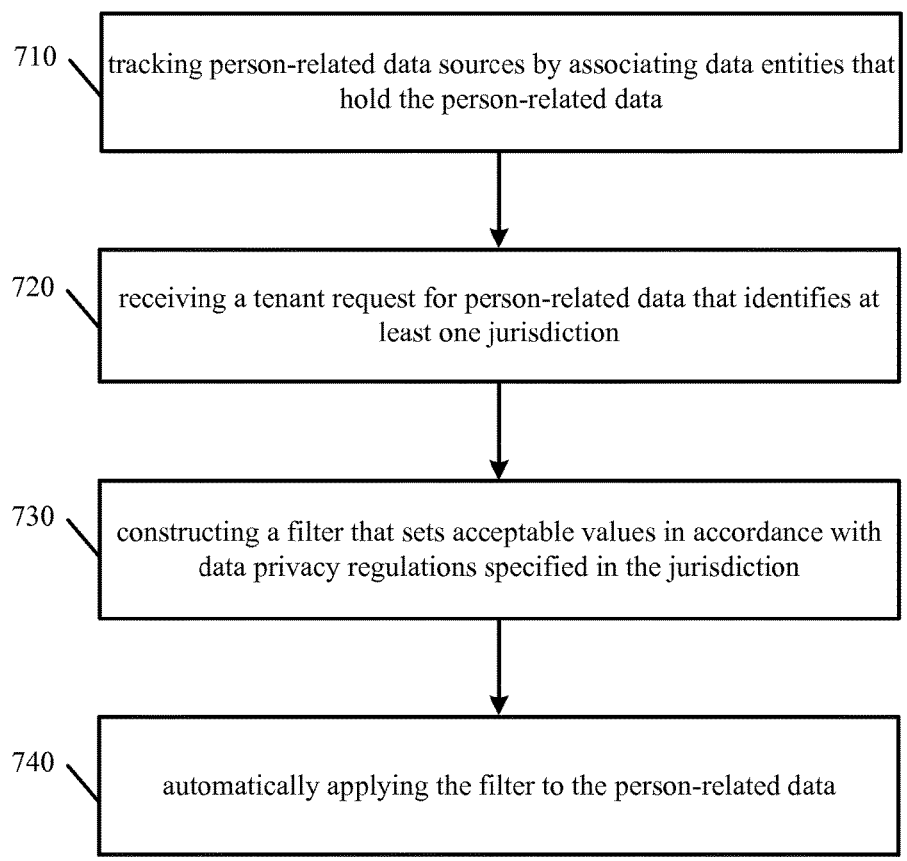
FIG. 7 – Flowchart of Automatically Complying with Data Privacy Laws

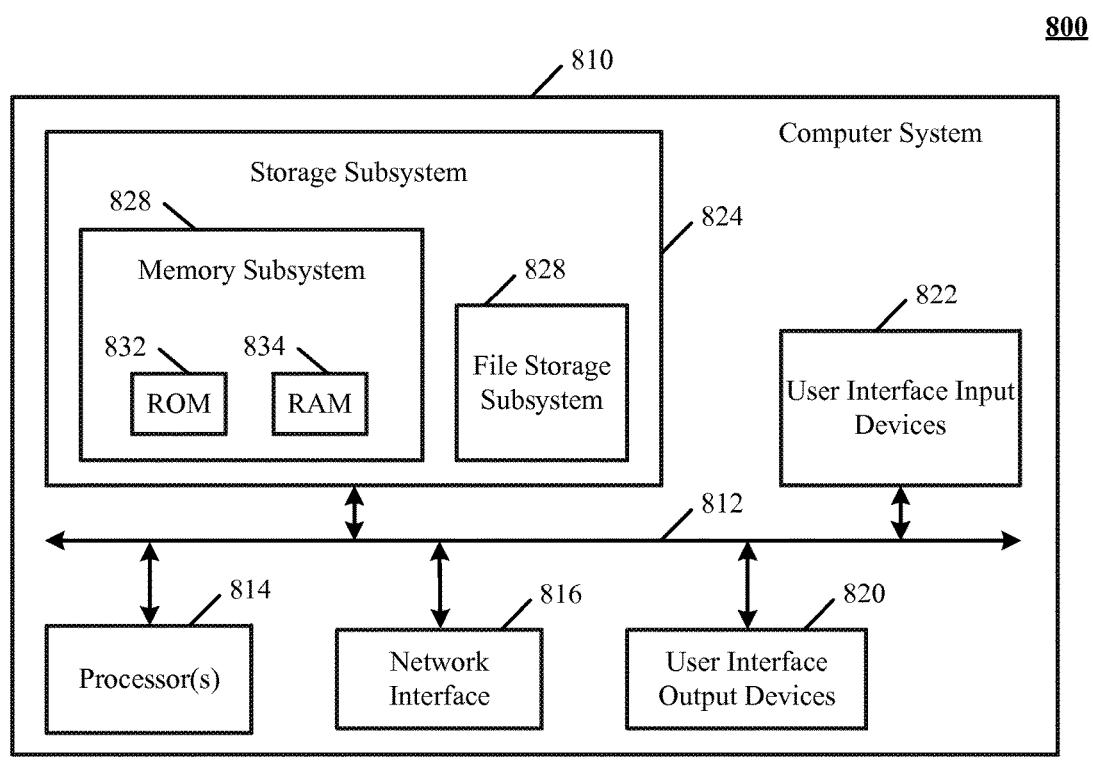
FIG. 8 – Computer System

US 10,430,608 B2

SYSTEMS AND METHODS OF AUTOMATED COMPLIANCE WITH DATA PRIVACY LAWS

RELATED APPLICATION

The application claims the benefit of U.S. provisional Patent Application No. 61/835,225, entitled, "Systems and Methods for Managing Social Data as Per Third-Party Preferences," filed on Jun. 14, 2013. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The use by companies of information about individuals is subject to a complex array of data protection laws. Companies that create, collect, process, store, or consume personal information have to comply with numerous data privacy laws and regulations to prevent loss of customer support, regulatory investigations, and substantial fines. Furthermore, the numerous data privacy laws and regulations differ from country to country, thus increasing the complication. In many jurisdictions, class action lawsuits are becoming the norm for data breaches involving significant numbers of affected individuals.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows an example environment of automated compliance with data privacy laws.

FIG. 2 is one implementation of person-related data.

FIG. 3 shows one implementation of a trust object linked to person-related data entity.

FIG. 4 illustrates details of trust metadata held by a trust object.

FIG. 5 depicts one implementation of acceptable values of trust metadata in accordance with data privacy regulations specified in a jurisdiction.

FIG. 6 is one implementation of a trust filter interface that is constructed for automatically complying with data privacy laws.

FIG. 7 shows a flowchart of one implementation of automated compliance with data privacy laws.

FIG. 8 is a block diagram of an example computer system for automatically complying with data privacy laws.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to automated compliance with data privacy laws by using computer-implemented systems. The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "dependent on" a predecessor signal, event or value if the predecessor signal, event or value influenced the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" to each of the signal, event or value inputs. If the given signal, event or value is the same as the predecessor signal, event or value, this is merely a degenerate case in which the given signal, event or value is still considered to be "dependent on" the predecessor signal, event or value. "Responsiveness" of a given signal, event or value upon another signal, event or value is defined similarly.

Introduction

Data privacy laws vary dramatically from country to country. Some countries have enacted comprehensive laws, while others have few or no rules in place. For companies that do business around the world, the issue of privacy has indisputably become an international one, as countries throughout the world are increasingly active in enacting data privacy laws. Given the number and complexity of data privacy laws and regulations worldwide, and the severe penalties for violating them, companies are striving to prevent the improper disclosure or use of personal information of data subjects.

Laws governing data privacy protection are complicated, diverse, and jurisdiction specific. For instance, in the United States a complex patchwork system of state and federal laws cover data privacy, including the Federal Trade Commission Act, the Gramm-Leach-Bliley Act, and the Health Insurance Portability and Accountability Act of 1996. The European Union has a comprehensive data protection directive that requires compliance by all 27 member states. However, the European Union the directive allows significant variations among the member states. EU member approaches and enforcement have not been consistent.

Further, several Latin American countries have recently enacted or are drafting comprehensive legislative frameworks to protect private information. Throughout the Middle East, which previously had no data protection law, there is an emerging need and governments are responding. Meanwhile, China has sparse data protection law, and only a few countries in Africa, such as Tunisia and Mauritius, have adopted comprehensive privacy laws.

The technology disclosed addresses compliance with data privacy laws applicable to varying jurisdictions. It tracks various person-related sources that are used to assemble person-related data by associating person-related data entities with trust objects. Person-related data are data relating to living individuals, referred to as "data subjects," who can be identified from those data or from those data together with other information that is in or is likely to come into the possession of the entity that decides what the data will be used for, the "data providers." Person-related data also include opinions and indications about intentions of the data subject.

The trust object holds trust metadata, including name of the person-related data source, interface category of the person-related data source, origin of the person-related data source, consent-type given by subject of the person-related data, data privacy regulations applicable to the origin, at least one purpose of assembling the person-related data, and at least one classification of the person-related data. This metadata is further described below, in the discussion of FIG. 4.

When the data provider receives a request from a tenant for the person-related data, the technology disclosed constructs a filter that sets acceptable values, in accordance with the data privacy regulations applicable in the jurisdiction where the tenant intents to further use, process, or consume the person-related data. The filter is the automatically applied to the person-related data to restrict transfer of person-related data does not meet the data privacy regulations applicable to the jurisdiction.

For instance, if a tenant purchases person-related data of data subjects from Canada and further uses it in United States, the technology disclosed can be used to identify trust metadata that are not compliant with both Canada's and United States' data privacy regulations. Once the non-compliant trust metadata or data sources are identified, the technology disclosed automatically filters them to prevent their further use, thus ensuring compliance with the applicable jurisdictions.

In one example, if Canadian regulations require the data subjects to give express consent for using their personal information, the technology disclosed can automatically filter out all data subjects have provided only implied or opt-out consent. Additionally, if the United States regulations do not permit the use of personal information collected in bulk from application-programming interfaces (APIs), then the technology disclosed can automatically ensure that person-related data collected from APIs is not used, processed, or consumed in the United States.

Automated Compliance Environment

FIG. 1 shows an example environment 100 of automated compliance with data privacy laws. FIG. 1 includes a person-related database 102, trust database 108, user computing device 122, trust filter 124, network(s) 115, and tracker 128. In other implementations, environment 100 may not have the same elements or components as those listed above and/or may have other/different elements or components instead of, or in addition to, those listed above, such as an entity database, social database, or jurisdiction database. The different elements or components can be combined into single software modules and multiple software modules can run on the same hardware.

In some implementations, network(s) 115 can be any one or any combination of Local Area Network (LAN), Wide Area Network (WAN), WiFi, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, tracker 128 can be an engine of varying types including a workstation, server, computing cluster, blade server, server farm, or any other data processing system or computing device. Tracker 128 can be communicably coupled to the databases via a different network connection. For example, it can be coupled via the network 115 (e.g., the Internet) or to a direct network link.

In some implementations, datastores can store information from one or more tenants into tables of a common database image to form a multi-tenant database system (MTS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, user computing device 122 can be a personal computer, laptop computer, tablet computer, smartphone, personal digital assistant (PDA), digital image capture devices, and the like. In one implementation, an application or service like trust filter 124 runs on user computing device 122.

Person-related database 102 specifies different entities (persons and organizations) such as contacts, accounts, opportunities, and/or leads and further provides business information related to the respective entities. Examples of business information can include names, addresses, job titles, number of employees, industry types, territories, market segments, contact information, employer information, stock prices, SIC codes, and NAICS codes. In one implementation, person-related database 102 can store web or database profiles of the users and organizations as a system of interlinked hypertext documents that can be accessed via the network 115 (e.g., the Internet). In another implementation, person-related database 105 can also include standard profile information about persons and organizations. This standard profile information can be extracted from company websites, business registration sources such as Jigsaw, Hoovers, or D&B, business intelligence sources such as Yelp or Yellow Pages, and social networking websites like Chatter, Facebook, Twitter, or LinkedIn.

Regarding different types of person-related data sources or "interface categories," the interface categories specify whether a person-related data source is access controlled or publicly available on the Internet or a social network. Examples of access controlled application programming interfaces (APIs) can include Yahoo Boss, Facebook Open Graph, or Twitter Firehose. Public Internet includes first hand websites, blogs, search aggregators, or social media aggregators. Facebook, Twitter, LinkedIn, or Klout qualify as examples of social networking sites.

In one implementation, access controlled APIs like Yahoo Boss, Facebook Open Graph, and Twitter Firehose can provide real-time search data aggregated from numerous social media sources such as LinkedIn, Yahoo, Facebook, and Twitter. APIs can initialize sorting, processing and normalization of data. Public Internet can provide data from public sources such as first hand websites, blogs, web search aggregators, and social media aggregators. Social networking sites can provide data directly from social media sources such as Twitter, Facebook, LinkedIn, and Klout.

In one implementation, tracker 128 spiders different person-related data sources to retrieve person-related data, including web data associated with the business-to-business contacts. In some implementations, tracker 128 can extract a list of contacts from a master database and search those contacts on the different person-related data sources in order to determine if social or web content associated with the contacts exists within those sources. If the person-related data sources provide positive matches to any of the contacts, tracker 128 can store the retrieved social or web content in person-related database 102, according to one implementation.

In another implementation, tracker 128 assembles social media content from the different types of person-related data sources. Social media content can include information about social media sources, social accounts, social personas, social profiles, social handles, digital business cards, images, or contact information of users, which can be stored in person-related database 102.

Tracker 128 automates compliance with data privacy laws by tracking the different person-related data sources and associating data entities that hold person-related data with trust objects that track the different sources. In one implementation, it constructs filters that set acceptable values for trust metadata, in accordance with data privacy regulations of a particular jurisdiction.

Person-Related Data

FIG. 2 shows an example schema of person-related data 200. This and other data structure descriptions that are expressed in terms of objects can also be implemented as tables that store multiple records or object types. Reference to objects is for convenience of explanation and not as a limitation on the data structure implementation. FIG. 2 shows a profile object 216 linked to event object 208, feed object 218, connection object 228, group object 224, and photo object 204. Photo object 204 is further linked to photo album object 202 and photo tag object 214. In other implementations, person-related data 200 may not have the same objects, tables, fields or entries as those listed above and/or may have other/different objects, tables, fields or entries instead of, or in addition to, those listed above such as a work object, education object, or contact information object.

Profile object 216 provides primary information that identifies a user and includes different fields that store biographic information about a user such as first name, last name, sex, birthday, work history, interests, and the like. The profile object 216 is further linked to other objects that provide supplementary information about the user. For instance, profile object 216 is linked to an event object 208 that stores information related to events subscribed, checked-in, or attended by the user. In one implementation, profile object 216 is linked to a feed object 218 that specifies different feeds items such as posts, comments, replies, mentions, etc. posted by the user or on user's profile.

In another implementation, profile object 216 is linked to a connection object 228 that provides information about other persons in the social network of the user. In one implementation, profile object 216 is linked to a group object 224 that identifies the groups the user is part of. In yet another implementation, profile object 216 is linked to a photo object 204 that identifies an image, which is uploaded, posted, or selected by the user. The photo object 204 is further linked to a photo album object 202 that categorizes the image and to a photo tag object 214 that describes the image.

In some implementations, person-related data 200 can have one or more of the following variables with certain attributes: USER_ID being CHAR (15 BYTE), IMAGES_ID being CHAR (15 BYTE), EVENT_ID being CHAR (15 BYTE), GROUP_ID being CHAR (15 BYTE), CONNECTION_ID being CHAR (15 BYTE), FEED_ITEM_ID being CHAR (15 BYTE), CREATED_BY being CHAR (15 BYTE), CREATED_DATE being DATE, and DELETED being CHAR (1 BYTE).

Trust Object and Trust Metadata

FIG. 3 shows one implementation of a trust object 315 linked to person-related data entity 216. This and other data structure descriptions that are expressed in terms of objects can also be implemented as tables that store multiple records or object types. Reference to objects is for convenience of explanation and not as a limitation on the data structure implementation. Trust object 315 holds trust metadata that include names of person-related data sources from which person related data 200 is assembled by tracker 128, interface categories of the person-related data sources, origins of the person-related data sources, consent-types given by subjects of the person-related data 200, data privacy regulations applicable to the origins, different purposes of assembling the person-related data 200, and classifications of the person-related data 200. In other implementations, association 300 may not have the same objects, tables, fields, or entries as those listed above and/or may have other/different objects, tables, fields or entries instead of, or in addition to, those listed above such as opt-in law object, unsubscribe life object, or message type object.

Some implementations can include trust objects being linked to individual entity fields 216A-K of the person-related data entity 216. In such an implementation, person-related data sources that provide data for populating entity fields 216A-K are tracked by associating the individual entity fields 216A-K with respective trust objects that tracks the sources. Other implementations can include the different objects, tables, fields or entries of person-related data 200 being associated with different trust objects that track respective person-related data sources which populate the objects, tables, fields or entries.

In yet another implementation, association 300 can have one or more of the following variables with certain attributes: LINK_ID being CHAR (15 BYTE), DATA_ENTITY_ID being CHAR (15 BYTE), TRUST_ITEM_ID being CHAR (15 BYTE), CREATED_BY being CHAR (15 BYTE), CREATED_DATE being DATE, and DELETED being CHAR (1 BYTE).

FIG. 4 illustrates details of trust metadata 400 held by trust object 315. This and other data structure descriptions that are expressed in terms of objects can also be implemented as tables that store multiple records or object types. Reference to objects is for convenience of explanation and not as a limitation on the data structure implementation. FIG. 4 shows trust object 315 linked to a name object 402, interface category object 408, jurisdiction object 412, consent-type object 418, regulation object 422, purpose object 428, and classification object 445. In other implementations, trust metadata 400 may not have the same objects, tables, fields or entries as those listed above and/or may have other/different objects, tables, fields or entries instead of, or in addition to, those listed above such as a work object, education object, or contact information object.

Name object 402 includes names of the person-related data sources from which person-related data is assembled. In the example shown in FIG. 4, name object 402 identifies Twitter and Facebook as the person-related data sources that provide the person-related data. Interface category object 408 specifies the type of the person-related data sources included in the name object 402. The sources can be of various types, including: APIs like Yahoo Boss, Facebook Open Graph, or Twitter Firehose, Public Internet platforms such as first hand websites, blogs, search aggregators, or social media aggregators, or social networking sites like Facebook, Twitter, LinkedIn, Klout, and the like.

Jurisdiction object 412 identifies different origins of the person-related data sources. In one implementation, it specifies geographic locations (countries, states, etc.) of the person-related data sources. In another implementation, it includes applicable jurisdictions (United States law, European Union law, etc.) of the person-related data sources.

Consent-type object 418 records the type of consent associated with a data subject of person related data 200. When an organization collects personal information from an individual, most privacy legislation requires that an individual's consent be given so that an organization can collect, use, or disclose it. In some implementations, there are three different types of consent an organization can obtain— explicit consent, implicit consent, and opt-out consent. Explicit consent refers to clear and documentable consent. In one implementation, an explicit consent specifies the particular types of data, the specific purposes for which they can be used, and/or the countries to which they can be disclosed. An example of providing explicit consent is signing any consent form that outlines why an organization would like to collect, use, or disclose an individual's personal information.

Implied consent is consent, which is not expressly granted by an individual, but rather derived from individual's specific actions and the circumstances that unequivocally demonstrate the individual's consent. In one example, implied consent can be inferred when an individual voluntarily provides personal information for an organization to collect, use, or disclose for purposes that would be considered obvious at the time, or when the personal information is used in a way that clearly benefits the individual and the organization's expectations are reasonable.

When an individual is given the option to decline consent but does not clearly decline consent, the consent is referred to as opt-out consent. Opt-out consent refers to being offered an option to opt-out, but not declining to give consent. For example, when purchasing a product online, an individual can be presented with a checkbox and asked to uncheck the box (opt-out) if the individual would not like his or her personal information to be shared with affiliates for marketing purposes.

Regulation object 422 identifies regulations applicable to a particular data collection, processing, or consumption venue. For instance, if person-related data of a data subject is collected from Canada, then regulation object 422 can record Spam Act as the regulation that must be complied with. In another instance, if the same data is processed or consumed in United States, regulation object 422 can identify CAN-SPAM as the applicable regulation. In some implementations, regulation object 422 can use flags or tags to uniquely identify the respective regulations applicable to a collection venue, processing venue, and consumption venue of person-related data of a data subject.

Purpose object 426 specifies the purpose for which person related of a data subject is collected. In one example, if a data subject provided his contact information to receive marketing calls related to dental service, then purpose object 426 identifies "dental service" as the purpose of the person-related data so as to prevent its use for any purposes. In another implementation, if a data subject consented for use of his person-related data for an electoral campaigning of particular type such as presidential election campaigns, purpose object 426 restricts use of that person-related data to presidential election campaigns and prevents solicitation of the user for other types of electoral campaigns such as Congressional elections.

Person-related data has different levels of sensitivity, corresponding to the personal data type, and different laws cover protection and access to particular personal data types. In one implementation, classification object 445 classifies person-related data as personal data and business data. Personal data includes personal information such an individual's name, social security number, driver's license number, personal e-mail, state identification number, financial account number, credit card number, electronically stored biometric information, protected health information, and the like. Business data specifies an individual's employer, work address, job title, work e-mail, department, or industry. In another implementation, classification object 445 classifies person-related data as restricted data, controlled data, and public data with different levels of access controls.

In yet another implementation, trust metadata 400 can have one or more of the following variables with certain attributes: METADATA_ENTITY_ID being CHAR (15 BYTE), METADATA_ENTITY_TOTAL_ID being CHAR (15 BYTE), SOURCE_TYPE_ID being CHAR (15 BYTE), LAW_ID being CHAR (15 BYTE), ACCESS_CONTROL_ID being CHAR (15 BYTE), RESTRICTION_TYPE_ID being CHAR (15 BYTE), CREATED_BY being CHAR (15 BYTE), CREATED_DATE being DATE, and DELETED being CHAR (1 BYTE).

FIG. 5 depicts one implementation of a functional data structure that reflects values of trust metadata 500 that comply with data privacy regulations of a jurisdiction. Multiple data structures reflect compliance requirements of multiple jurisdictions. A program functional interprets the data to set filters according to an applicable jurisdiction. The data filters control transfer or use of data and can be used to implement legal compliance as describe herein. Reference in this description to objects and fields is for convenience of explanation and not as a limitation on the data structure implementation.

FIG. 5 shows a regulation object 516 linked to an engagement preference type object 518 and an API object 528. In other implementations, acceptable values 500 may not have the same objects, tables, fields or entries as those listed above and/or may have other/different objects, tables, fields or entries instead of, or in addition to, those listed. In some implementations, regulation objects 516 can be grouped under state, country or other jurisdiction objects, which are not shown.

In one implementation, a filter is constructed that sets acceptable values 500 in accordance with the data privacy regulations specified in a particular jurisdiction. For instance, if a data provider wants a set of person-related data to comply with United States jurisdiction, then the person-related data set should have field values consistent with that required by the applicable CAN-SPAM Act. As shown in FIG. 5, engagement preferences required by the CAN-SPAM ACT can be met by linking CAN-SPAM regulation object 516 to an engagement preferences type object 518. Engagement preferences type object 518 can specify an engagement preference of type "Not-Opt-Out-For-Display" such that displaying person-related data of data subjects requires that the data subjects have not opted out and thus necessitates providing valid and simple opt-out mechanism or operative unsubscribe facility. In another example, an engagement preference of type "Opt-In-Out-For-Display" can require an explicit opt-in of the data subjects. Similarly, API object 528 can identify the different person-related data sources that follow and enforce the CAN-SPAM Act. In other implementations, acceptable values that identify specific opt-in/opt-out mediums like email (Not-Opt-Out-For-Email/Opt-In-For-Email) or specific solicitation purposes like campaigns (Opt-Out-For-Campaigns/Opt-In-For-Campaigns) can be set.

Trust Filter Interface

FIG. 6 illustrates one implementation of generating for display a trust filter interface 124 that can be used to automatically comply with data privacy laws. Trust filter interface 124 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, trust filter interface 124 can be accessed from a browser running on a computing device. The browser can be Chrome, Internet Explorer, Firefox, Safari, and the like. In other implementations, trust filter interface 124 can run as an engagement console on a computer desktop application.

In other implementations, trust filter 600 can be presented in online social networks such as Salesforce's Chatter, Facebook, Twitter, LinkedIn, and the like. FIG. 6 also shows an interface category tab 610, source type tab 620, jurisdiction tab 630, regulation tab 640, consent tab 650, purpose tab 660, and classification tab 670. In other implementations, user interface 600 may not have the same widgets or screen objects as those listed above and/or may have other/different widgets or screen objects instead of, or in addition to, those listed above such as language tab, subscribe life tab, or message type tab.

In particular, trust filter interface 124 can be used by tenant personnel such as privacy engineers or privacy administrators to specify the privacy requirements or regulations that would want the instant person-related data to comply with. In one implementation, interface category tab 610 can be used to select the type of person-related data source from which person-related data is collected. Further, source type tab 620 can be used to particularly specify a source from which person-related data is assembled. Then, a collection point, processing point, usage point, or consumption point of the data can be selected via jurisdiction tab 630. In some implementations, the jurisdiction can be automatically selected based on the type or name of the person-related data source. Also, regulations applicable to the selected collection point, processing point, usage point, or consumption point can be identified using regulation tab 640. In other implementations, the one or more applicable regulations can be automatically selected based on the collection point, processing point, usage point, or consumption point of the person-related data source.

Consent tab 650 can be used to select the type of consent that is mandated by the regulations applicable to the selected collection point, processing point, usage point, or consumption point. Similarly, purpose tab 660 can specify the purposes for which the subsequent processing, usage, or consumption of the person-related data must be restricted to. Additionally, further processing, usage, or consumption of the person-related data can be limited to only its person or business data types through the classification tab 670.

Flowchart of Automatically Complying with Data Privacy Laws

FIG. 7 is a flowchart 700 of one implementation of automated compliance with data privacy laws. Flowchart 700 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 710, a person-related data source is tracked by associating a data entity that holds person-related data with a trust object that tracks the source. The trust object holds trust metadata, including name of the person-related data source, interface category of the person-related data source, origin of the person-related data source, consent-type given by subject of the person-related data, data privacy regulations applicable to the origin, at least one purpose of assembling the person-related data, and at least one classification of the person-related data.

At action 720, a tenant request for the person-related data is request. The tenant request identifies a jurisdiction for subsequently processing, or using, consuming the person-related data. In one implementation, a tenant can be a customer, customer department, business or legal organization, and/or any other entity that acquires person-related data for sales, marketing, campaigning or other customer engagement purposes from a primary data provider who owns crowd-sourced data repositories or knowledge bases.

At action 730, a filter is constructed that sets acceptable values, in accordance with the data privacy regulations specified in the jurisdiction, for the name of the person-related data source, origin of the person-related data source, consent-type given by subject of the person-related data, the purpose of assembling the person-related data, and the classification of the person-related data.

At action 740, the filter is automatically applied to the person-related data to restrict transfer of any person-related data that do not meet the data privacy regulations. In one implementation, transfer of the filtered person-related data into the jurisdiction used to construct the filter is automatically authorized. In another implementation, tenant personnel stationed in the jurisdiction used to construct the filter automatically authorize access to the filtered person-related data.

Computer System

FIG. 8 is a block diagram of an example computer system 800 for automatically complying with data privacy laws. Computer system 810 typically includes at least one processor 614 that communicates with a number of peripheral devices via bus subsystem 812. These peripheral devices can include a storage subsystem 824 including, for example, memory devices and a file storage subsystem, user interface input devices 822, user interface output devices 820, and a network interface subsystem 818. The input and output devices allow user interaction with computer system 810. Network interface subsystem 816 provides an interface to outside networks, including an interface to corresponding interface devices in other computer systems.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 820 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 814 alone or in combination with other processors.

Memory 826 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 826 in the storage subsystem 824, or in other machines accessible by the processor.

Bus subsystem 812 provides a mechanism for letting the different components and subsystems of computer system 810 communicate with each other as intended. Although bus subsystem 812 is shown schematically as a single bus, alternative implementations of the bus subsystem can use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

Particular Implementations

In one implementation, a method is described from the perspective of a server receiving messages from user software. The method includes tracking a person-related data source by associating a data entity that holds person-related data with a trust object that tracks the source. The trust object holds trust metadata, including name of the person-related data source, interface category of the person-related data source, origin of the person-related data source, consent-type given by subject of the person-related data, data privacy regulations applicable to the origin, at least one purpose of assembling the person-related data, and at least one classification of the person-related data.

The method also includes receiving a tenant request for the person-related data, wherein the tenant request identifies at least one jurisdiction for subsequently using the person-related data. It includes constructing a filter that sets acceptable values, in accordance with the data privacy regulations specified in the jurisdiction, for the name of the person-related data source, origin of the person-related data source, consent-type given by subject of the person-related data, the purpose of assembling the person-related data, and the classification of the person-related data. It further includes automatically applying the filter to the person-related data to restrict transfer of any person-related data that do not meet the data privacy regulations.

This method described can be presented from the perspective of a mobile device and user software interacting with a server. From the mobile device perspective, the method includes tracking a person-related data source by associating a data entity that holds person-related data with a trust object that tracks the source. The trust object holds trust metadata, including name of the person-related data source, interface category of the person-related data source, origin of the person-related data source, consent-type given by subject of the person-related data, data privacy regulations applicable to the origin, at least one purpose of assembling the person-related data, and at least one classification of the person-related data.

The method also includes receiving a tenant request for the person-related data, wherein the tenant request identifies at least one jurisdiction for subsequently using the person-related data. The method relies on the server to construct a filter that sets acceptable values, in accordance with the data privacy regulations specified in the jurisdiction, for the name of the person-related data source, origin of the person-related data source, consent-type given by subject of the person-related data, the purpose of assembling the person-related data, and the classification of the person-related data. It further includes automatically applying the filter to the person-related data to restrict transfer of any person-related data that do not meet the data privacy regulations.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as automated compliance environment, trust object, trust metadata, or trust filter.

The interface categories of person-related data sources include access controlled APIs, public Internet, and social networking sites. The origin of the person-related data source identifies at least one geographic location of the source. Consent-types of subjects of person-related data include at least express consent, implied consent, and opt-out consent. The classification of the person-related data includes at least personal data and business data.

The method also includes automatically authorizing transfer of the filtered person-related data into the jurisdiction used to construct the filter. It further includes automatically authorizing access to the filtered person-related data by tenant personnel stationed in the jurisdiction used to construct the filter.

Other implementations include a non-transitory computer readable storage medium storing instructions executable by a processor to perform any of the methods described above.

Yet other implementations include a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A method of a server restricting transfer of private data that do not meet data privacy regulations, the method including:
   tracking a person-related data source by associating a data entity that holds person-related data with a trust object that tracks the person-related data source, wherein the person-related data includes private data;
   wherein the trust object holds trust metadata, including:
      name of the person-related data source,
      interface category of the person-related data source,
      physical origin of the person-related data source,
      consent-type given by subject of the person-related data,
      data privacy regulations that control access to the private data and are set for a legal jurisdiction that governs the physical origin,
      at least one purpose of assembling the person-related data, and
      at least one classification of the person-related data;
   representing the data privacy regulations set for the legal jurisdiction that governs the physical origin of the person-related data in an access control object that specifies, by the legal jurisdiction, access control based on the name of the person-related data source, the physical origin of the person-related data source, the consent-type given by subject of the person-related data, the purpose of assembling the person-related data, and the classification of the person-related data;
   receiving, from a client computer, a tenant request for the person-related data, wherein the tenant request identifies at least one legal jurisdiction where the person-related data will be subsequently used;
   constructing a filter that implements access control, in accordance with the access control object representing the data privacy regulations specified in the legal jurisdiction that governs the physical origin of the person-related data, for the name of the person-related data source, the physical origin of the person-related data source, the consent-type given by subject of the person-related data, the purpose of assembling the person-related data, and the classification of the person-related data; and
   automatically applying the filter to the person-related data requested by the client computer to restrict transfer of any private data, from the server to the client computer, that do not meet the data privacy regulations specified in the legal jurisdiction that governs the physical origin of the person-related data, and to restrict transfer of any private data from the server to the client computer that do not meet the data privacy regulations of the at least one legal jurisdiction identified in the tenant request.

2. The method of claim 1, wherein interface categories of person-related data sources include access controlled APIs, public Internet, and social networking sites.

3. The method of claim 1, wherein the physical origin of the person-related data source identifies at least one geographic location of the person-related data source.

4. The method of claim 1, wherein consent-types of subjects of person-related data include at least express consent, implied consent, and opt-out consent.

5. The method of claim 1, wherein the classification of the person-related data includes at least personal data and business data.

6. The method of claim 1, further including automatically authorizing transfer of filtered person-related data into the legal jurisdiction used to construct the filter.

7. The method of claim 1, further including automatically authorizing access to filtered person-related data by tenant personnel stationed in the legal jurisdiction used to construct the filter.

8. A system, including:
   a server including a processor and a computer readable storage medium storing computer instructions configured to cause the processor to:
      track a person-related data source by associating a data entity that holds person-related data with a trust object that tracks the person-related data source, wherein the person-related data includes private data;
      wherein the trust object holds trust metadata, including:
      name of the person-related data source,
      interface category of the person-related data source,
      physical origin of the person-related data source,
      consent-type given by subject of the person-related data,
      data privacy regulations that control access to the private data and are set for a legal jurisdiction that governs the physical origin,
      at least one purpose of assembling the person-related data, and
      at least one classification of the person-related data;
      represent the data privacy regulations set for the legal jurisdiction that governs the physical origin of the person-related data in an access control object that specifies, by the legal jurisdiction, access control based on the name of the person-related data source, the physical origin of the person-related data source, the consent-type given by subject of the person-related data, the purpose of assembling the person-related data, and the classification of the person-related data;
      receive, from a client computer, a tenant request for the person-related data, wherein the tenant request identifies at least one legal jurisdiction where the person-related data will be subsequently used;
      construct a filter that implements access control, in accordance with the access control object representing the data privacy regulations specified in the legal jurisdiction that governs the physical origin of the person-related data, for the name of the person-related data source, the physical origin of the person-related data source, the consent-type given by subject of the person-related data, the purpose of assembling the person-related data, and the classification of the person-related data; and
      automatically apply the filter to the person-related data requested by the client computer to restrict transfer of any private data, from the server to the client computer, that do not meet the data privacy regulations specified in the legal jurisdiction that governs the physical origin of the person-related data, and to restrict transfer of any private data from the server to the client computer that do not meet the data privacy regulations of the at least one legal jurisdiction identified in the tenant request.

9. The system of claim 8, wherein interface categories of person-related data sources include access controlled APIs, public Internet, and social networking sites.

10. The system of claim 8, wherein the physical origin of the person-related data source identifies at least one geographic location of the person-related data source.

11. The system of claim 8, wherein consent-types of subjects of person-related data include at least express consent, implied consent, and opt-out consent.

12. The system of claim 8, wherein the classification of the person-related data includes at least personal data and business data.

13. The system of claim 8, further including automatically authorizing transfer of filtered person-related data into the legal jurisdiction used to construct the filter.

14. The system of claim 8, further including automatically authorizing access to filtered person-related data by tenant personnel stationed in the legal jurisdiction used to construct the filter.

15. The method of claim 1, wherein the tenant request is received from a tenant subject to the at least one legal jurisdiction for subsequently using the person-related data, and the subject of the person-related data is subject to the legal jurisdiction that governs the physical origin of the person-related data.

* * * * *